(12) United States Patent
Yang et al.

(10) Patent No.: US 8,042,627 B2
(45) Date of Patent: Oct. 25, 2011

(54) WALKING ROBOT

(75) Inventors: Soo Sang Yang, Suwon-si (KR); Yeon Taek Oh, Yongin-si (KR); Youn Baek Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 163 days.

(21) Appl. No.: 12/379,306

(22) Filed: Feb. 18, 2009

(65) Prior Publication Data
US 2009/0301798 A1 Dec. 10, 2009

(30) Foreign Application Priority Data
Jun. 5, 2008 (KR) .................. 10-2008-0052913

(51) Int. Cl.
*B62D 57/032* (2006.01)
(52) U.S. Cl. .................. 180/8.6; 318/568.12; 901/1
(58) Field of Classification Search .................. 180/8.1, 180/8.2, 8.5, 8.6; 901/1; 318/568.12, 568.11, 318/568.16
See application file for complete search history.

(56) References Cited

U.S. PATENT DOCUMENTS

| 949,287 | A | * | 2/1910 | Perew et al. | 180/8.1 |
| 4,797,061 | A | * | 1/1989 | Munakata | 414/744.5 |
| 6,962,220 | B2 | * | 11/2005 | Takenaka et al. | 180/8.6 |
| 7,143,850 | B2 | * | 12/2006 | Takenaka et al. | 180/8.6 |
| 7,492,115 | B2 | * | 2/2009 | Gomi et al. | 318/568.11 |
| 2008/0210477 | A1 | * | 9/2008 | Takenaka et al. | 180/8.6 |
| 2009/0039819 | A1 | * | 2/2009 | Wilson et al. | 318/568.12 |
| 2010/0000365 | A1 | * | 1/2010 | Ogawa | 74/490.05 |

FOREIGN PATENT DOCUMENTS
KR 10-2001-0050273 6/2001
* cited by examiner

*Primary Examiner* — Anne Marie M Boehler
(74) *Attorney, Agent, or Firm* — Staas & Halsey LLP

(57) ABSTRACT

Disclosed is a walking robot having an improved driving structure for a pitch-direction femoral joint and a knee joint. The walking robot includes a pitch-direction actuator driving the pitch-direction femoral joint to rotate a femoral link relative to a body in a pitch direction, and a power transmission unit transferring driving force of the pitch-direction actuator to the knee joint to rotate the lower leg link relative to the femoral link in the pitch direction.

14 Claims, 6 Drawing Sheets

WALKING ROBOT

CROSS-REFERENCE TO RELATED APPLICATIONS

This application claims the benefit of Korean Patent Application No. 10-2008-0052913 filed on Jun. 5, 2008, in the Korean Intellectual Property Office, the disclosure of which is incorporated herein by reference.

BACKGROUND

1. Field

The present invention relates to a walking robot. More particularly, the present invention relates to a walking robot having an improved driving structure for a pitch-direction femoral joint and a knee joint.

2. Description of the Related Art

Various types of walking robots, such as a biped walking robot or a four-legged walking robot, have been developed for the purpose of household use, military use, or industrial use.

Korean Unexamined Patent Publication No. 2001-50273 discloses a humanoid in the form of a biped walking robot.

The robot disclosed in Korean Unexamined Patent Publication No. 2001-50273 includes a body, a head provided at an upper end portion of the body, a pair of arms provided at both upper lateral sides of the body, and a pair of legs provided at both lower lateral sides of the body.

Each leg includes a femoral link connected to the body through a femoral joint performing 3-DOF (degree of freedom) movement, a lower leg link connected to the femoral link through a knee joint performing 1-DOF movement, and a foot connected to the lower leg link through an ankle link performing 2-DOF movement, so that the robot can perform 6-DOF movement. Accordingly, the robot can perform various actions using the legs as well as running and walking.

In particular, the running and walking of the robot can be realized by repeatedly rotating a pitch-direction femoral joint and a knee joint and a large impact is applied to the robot through the foot of the robot when the robot walks or runs on the ground. Such an impact can be attenuated by controlling the pitch-direction femoral joint, the knee joint, etc.

However, the joints, in particular, the pitch-direction femoral joint and the knee joint are independently driven by two actuators in the conventional walking robot, so the control mechanism may be complicated to effectively attenuate the impact.

In addition, the actuator for driving the knee joint is positioned adjacent to the knee joint in the conventional walking robot, so great inertial force is generated in the leg during walking and great load is applied to the actuator for driving the femoral joint.

SUMMARY

Accordingly, it is an aspect of the present invention to provide a walking robot capable of simplifying control mechanism by improving a driving structure for a pitch-direction femoral joint and a knee joint and performing natural walking at a relatively lower output force by reducing inertial force generated in legs during walking.

Additional aspects and/or advantages will be set forth in part in the description which follows and, in part, will be apparent from the description, or may be learned by practice of the invention.

The foregoing and and/or other aspects of the present invention are achieved by providing a walking robot including a body, a femoral link, and a first pitch-direction femoral joint connecting the body to the femoral link, a lower leg link and a knee joint connecting the femoral link to a lower leg link, a first pitch-direction actuator driving the first pitch-direction femoral joint to rotate the femoral link relative to the body in a pitch direction, and a power transmission unit transferring a driving force of the first pitch-direction actuator to the knee joint to rotate the lower leg link relative to the femoral link in the pitch direction.

The walking robot further includes a second pitch-direction femoral joint connecting the body to the femoral link, and a second pitch-direction actuator driving the second pitch-direction femoral joint.

The walking robot further includes a power control device installed between the first and second pitch-direction femoral joints to couple the first pitch-direction femoral joint with the second pitch-direction femoral joint or decouple the first pitch-direction femoral joint from the second pitch-direction femoral joint, and a controller controlling the power control device.

When the first pitch-direction femoral joint is coupled with the second pitch-direction femoral joint, the controller supplies power to the second pitch-direction actuator without supplying power to the first pitch-direction actuator.

When the first pitch-direction femoral joint is decoupled from the second pitch-direction femoral joint, the controller supplies power to the first pitch-direction actuator without supplying power to the second pitch-direction actuator.

The controller operates the second pitch-direction actuator.

The power transmission unit includes the femoral link connected to the first pitch-direction femoral joint and a transfer link rotatably coupled to the second pitch-direction femoral joint and the lower leg link while being spaced apart from the femoral link, and the knee joint connecting the femoral link to the lower leg link is provided at a predetermined region on a length of the lower leg link.

The transfer link is spaced apart from a center of the second pitch-direction femoral joint by a predetermined distance.

The power transmission unit rotates the lower leg link in a direction different from a rotating direction of the femoral link.

Each of the first and second pitch-direction actuators includes a motor generating rotational force and a reduction device adjusting a rotational speed of the motor.

The first pitch-direction femoral joint has a rotational center identical to a rotational center of the second pitch-direction femoral joint.

The foregoing and/or other aspects of the present invention are achieved by providing a walking robot including, a body, a femoral link, and a first pitch-direction femoral joint connecting a body to the femoral link, a lower thigh link, and a knee joint connecting the femoral link to the lower leg link, a first pitch-direction actuator driving the first pitch-direction femoral joint to rotate the femoral link relative to the body in a pitch direction, and a power transmission unit driving the knee joint in cooperation with the first pitch-direction actuator to rotate the lower leg link relative to the femoral link in the pitch direction.

According to still another aspect, there is provided a walking robot including a body, a leg section connected to the body and including a femoral link and a lower leg link, first and second pitch-direction femoral joints rotating the leg section relative to the body in a pitch direction, a first pitch-direction actuator driving the first pitch-direction femoral joint, a second pitch-direction actuator driving the first and second pitch-direction femoral joints, and a transfer link connecting the second pitch-direction femoral joint to the lower leg link to rotate the lower leg link relative to the femoral link in the pitch direction.

The walking robot further includes a power control device transferring a rotational force of the second pitch-direction femoral joint, which is driven by the second pitch-direction actuator, to the first pitch-direction femoral joint or shutting off the rotational force being transferred to the first pitch-direction femoral joint.

As described above, according to the walking robot of the embodiment of the present invention, control for the pitch-direction femoral joint and the knee joint can be simplified.

In addition, the inertial force generated in the legs of the walking robot can be remarkably reduced during walking, so that output force required to drive the legs can be reduced.

Further, one of the two actuators used to rotate the femoral link and the lower leg link in the pitch direction can be replaced with an actuator having low output force.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

Figure 1:
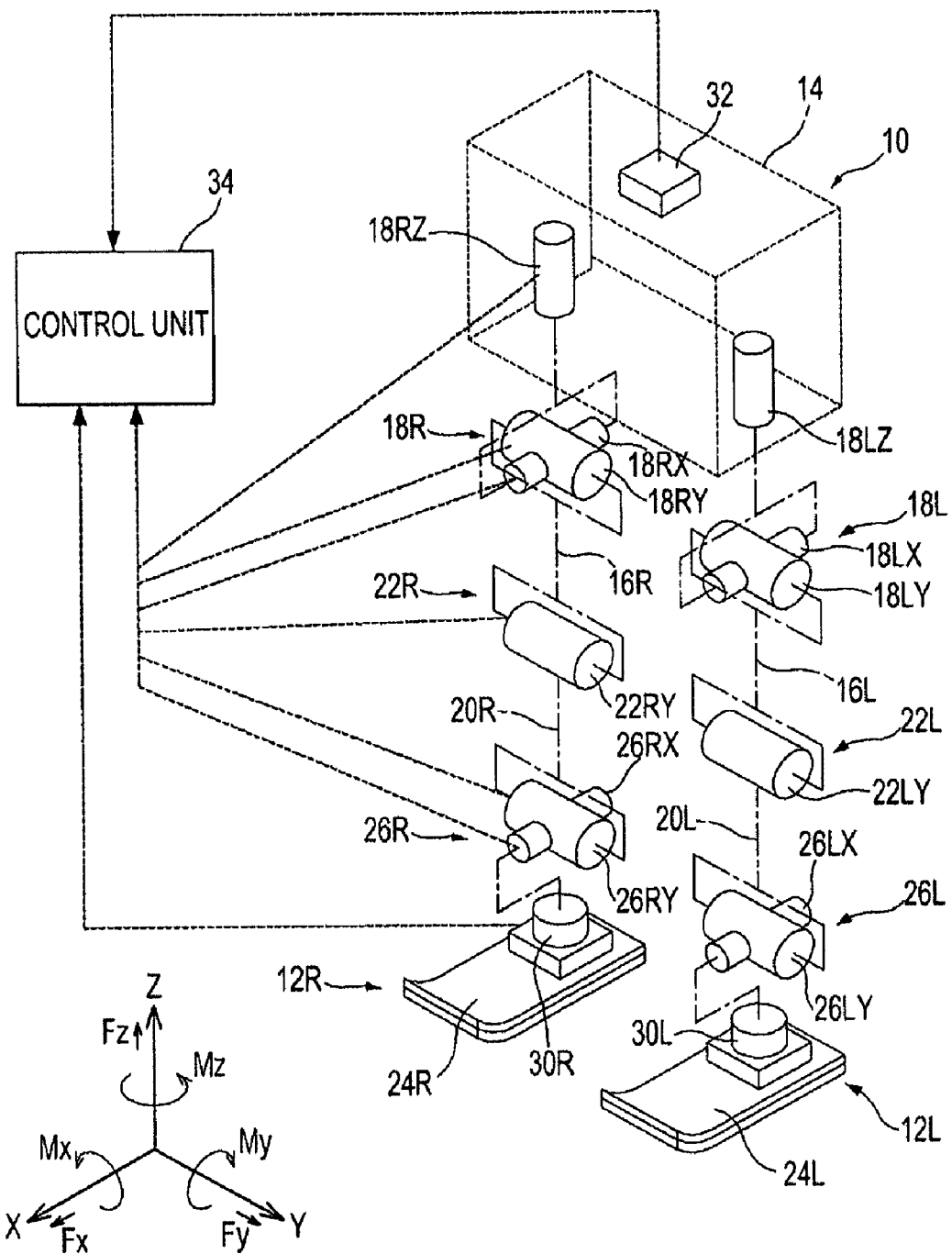
FIG. 1 is a schematic view showing a joint structure of a leg section of a walking robot according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

Hereinafter, a walking robot according to exemplary embodiments of the present invention will be described in detail with reference to the accompanying drawings.

FIG. 1 is a schematic view showing a joint structure of a leg section of the walking robot according to the embodiment of the present invention.

As shown in FIG. 1, a biped walking robot 10 (hereinafter, referred to as a robot) includes leg sections 12R and 12L (R denotes right and L denotes left). The leg sections 12R and 12L include femoral joints 18R and 18L, which connect a body 14 to femoral links 16R and 16L, knee joints 22R and 22L, which connect the femoral links 16R and 16L to lower leg links 20R and 20L, and ankle joints 26R and 26L, which connect the lower leg links 20R and 20L to feet 24R and 24L.

The femoral joints 18R and 18L include yaw-direction femoral joints 18RZ and 18LZ, which rotate distal end parts (that is, foot parts) about the longitudinal axis (Z axis, that is, the gravity direction) through the femoral links 16R and 16L, roll-direction femoral joints 18RX and 18LX, which rotate the distal end parts about the antero-posterior axis (X axis, that is, the travel direction) through the femoral links 16R and 16L, and pitch-direction femoral joints 18RY and 18LY, which rotate the distal end parts about the transverse axis (Y axis, that is, the direction perpendicular to the travel and gravity directions) through the femoral links 16R and 16L.

The knee joints 22R and 22L include pitch-direction knee joints 22RY and 22LY, which rotate the distal end parts about the transverse axis through the lower leg links 20R and 20L. In addition, the ankle joints 26R and 26L include roll-direction ankle joints 26RX and 26LX, which rotate the feet 24R and 24L about the antero-posterior axis, and pitch-direction ankle joints 26RY and 26LY, which rotate the feet 24R and 24L about the transverse axis. The above-described joints and links are driven by a driving motor (not shown in FIG. 1, but will be described later).

Six-axis force sensors 30R and 30L, which are generally known in the art, are installed between the ankle joints 26R and 26L and the feet 24R and 24L to measure three directional components Fx, Fy and Fz of force and three directional components Mx, My and Mz of moment in order to detect whether or not the leg sections 12R and 12L have landed and to detect repulsive force acting on the leg sections 12R and 12L. In addition, a tilt sensor 32 is installed on the body 14 in order to detect the inclination degree of the robot 10 with respect to the Z axis and the angular velocity thereof. Further, a rotary encoder (not shown) is installed in the driving motor to detect the rotation degree of the elements.

Outputs of the six-axis force sensors 30R and 30L and the tilt sensor 32 are input into a control unit 34 accommodated in the body 14. The control unit 34 calculates the control value of the driving motor based on the data stored in the memory (not shown) and the input data.

According to the above robot 10, each of the leg sections 12R and 12L may move with six-DOF (degree of freedom) and the driving motor is operated based on the control value calculated by the control unit 34, so that the robot 10 can move in the three-dimensional space as required by the user.

Hereinafter, the leg sections 12R and 12L of the robot 10 will be described in detail with reference to FIGS. 2 to 6. The following description will be made in relation to the left leg section 12L. Since the leg sections 12R and 12L have the symmetrical structure, the following description may also be applicable for the right leg section 12R.

Figure 2:
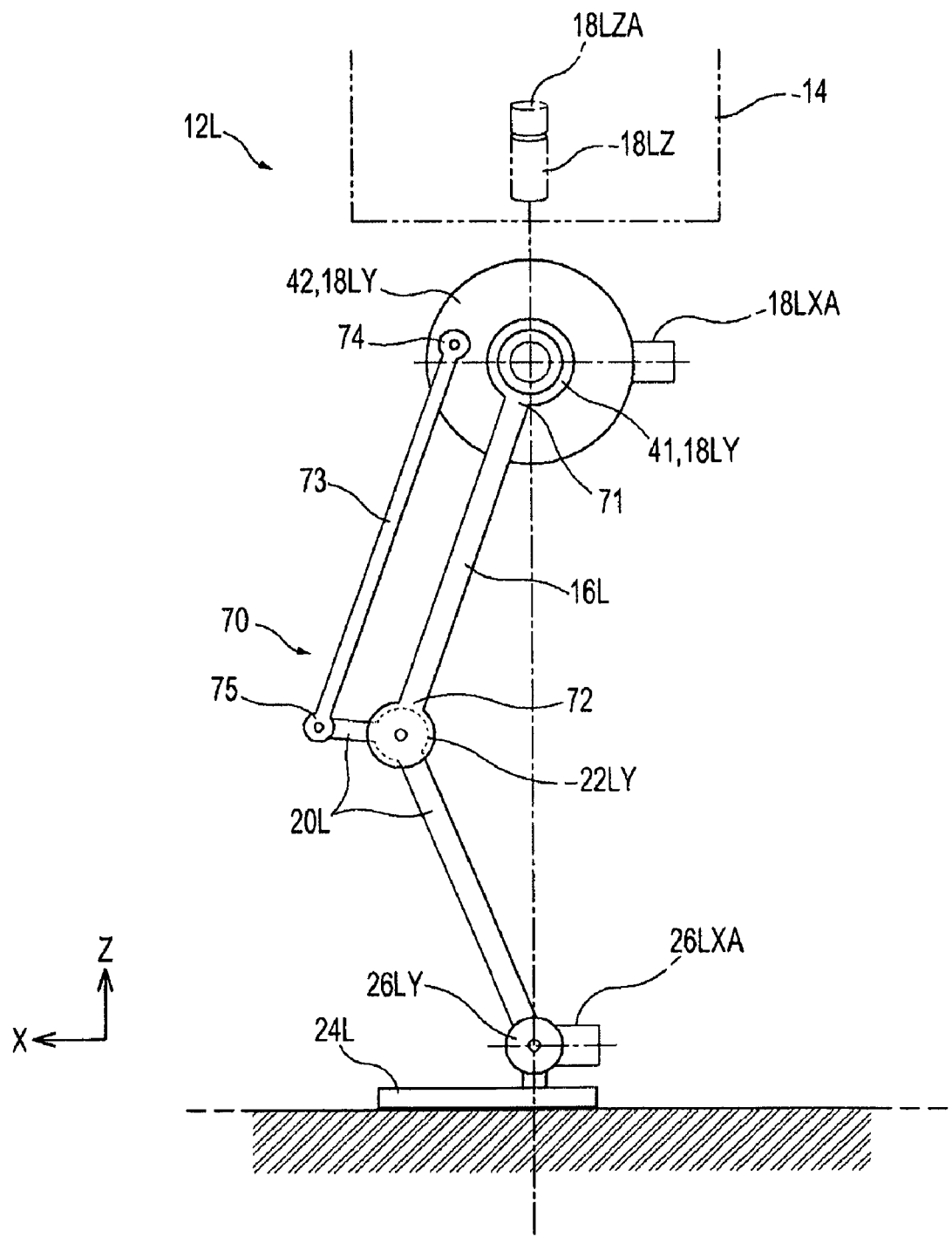
FIG. 2 is a right-side view showing a right side of the leg section of FIG. 1.
Figure 3:
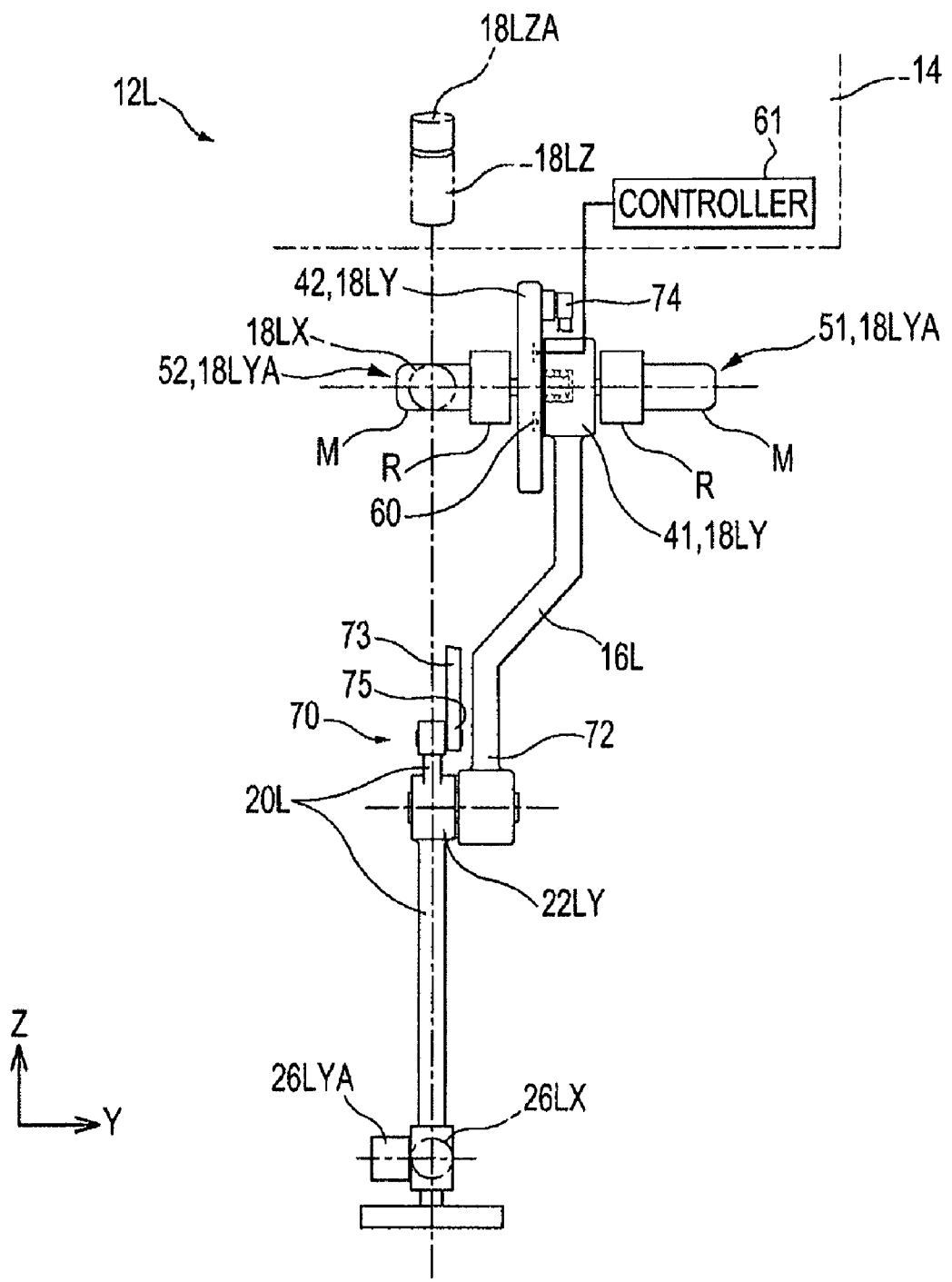
FIG. 3 is a front view showing a front side of the leg section of FIG. 1.

FIG. 2 is a right-side view showing a side of the leg section 12L of FIG. 1, and FIG. 3 is a front view showing a front side of the leg section 12L of FIG. 1.

As shown in FIGS. 2 and 3, a yaw-direction femoral joint actuator 18LZA is provided to rotate the leg section 12L about the Z axis by driving the yaw-direction femoral joint 18LZ, a roll-direction femoral joint actuator 18LXA is provided to rotate the leg section 12L about the X axis by driving the roll-direction femoral joint 18LX, and a pitch-direction femoral joint actuator 18LYA is provided to rotate the leg section 12L about the Y axis by driving the pitch-direction femoral joint 18LY.

The pitch-direction femoral joint 18LY includes a first pitch-direction femoral joint 41 and a second pitch-direction femoral joint 42, in which the first pitch-direction femoral joint 41 is rotatably installed on the second pitch-direction femoral joint 42. An electronic clutch 60 serving as a power control device is provided between the first pitch-direction femoral joint 41 and the second pitch-direction femoral joint 42. The electronic clutch 60 serves to couple or decouple the first and second pitch-direction femoral joints 41 and 42. In detail, the electronic clutch 60 includes a coil that generates magnetic force as electric power is applied thereto. If the electric power is applied to the coil, the coil generates the magnetic force so that the first pitch-direction femoral joint 41 is coupled to the second pitch-direction femoral joint 42 by magnetic force. In contrast, if the electric power being supplied to the coil is shut off, the magnetic force is removed so that the first pitch-direction femoral joint 41 is decoupled from the second pitch-direction femoral joint 42.

The pitch-direction femoral joint actuator 18LYA includes a first pitch-direction actuator 51 which rotates the femoral link 16L in the pitch direction relative to the body 14 by driving the first pitch-direction femoral joint 41 and a second pitch-direction actuator 52 which rotates the femoral link 16L in the pitch direction relative to the body 14 by driving the second pitch-direction femoral joint 42. The first and second pitch-direction actuators 51 and 52 include motors M and reduction devices R to drive the first and second pitch-direction femoral joints 41 and 42, respectively. The motor M is operated as power is applied thereto.

As mentioned above, the first and second pitch-direction femoral joints 41 and 42 are rotatable separately from each other. However, when the first and second pitch-direction femoral joints 41 and 42 are coupled to each other by the electronic clutch 60, power is applied to the motor M installed in the second pitch-direction actuator 52 so that the second pitch-direction femoral joint 42 is driven by the second pitch-direction actuator 52, but power is not applied to the motor M installed in the first pitch-direction actuator 51 so that the first pitch-direction femoral joint 41 is not driven by the first pitch-direction actuator 51. Nevertheless, since first pitch-direction femoral joint 41 is coupled to the second pitch-direction femoral joint 42, the first pitch-direction femoral joint 41 can be rotated by the second pitch-direction actuator 52.

In contrast, when the first and second pitch-direction femoral joints 41 and 42 are decoupled from each other due to the power-off of the electronic clutch 60, power is exclusively applied to the motor M installed in the first pitch-direction actuator 51, without being applied to the motor M installed in the second pitch-direction actuator 52. Thus, the first pitch-direction femoral joint 41 connected to the first pitch-direction actuator 51 is driven, but the second pitch-direction femoral joint 42 connected to the second pitch-direction actuator 52 is not driven. If it is necessary to drive the second pitch-direction femoral joint 42, power is applied to the second pitch-direction actuator 52.

In order to drive the first pitch-direction femoral joint 41 individually or together with the second pitch-direction femoral joint 42, or in order to drive the first pitch-direction femoral joint 41 subordinately to the second pitch-direction femoral joint 42, a controller 61 is provided. The controller 61 controls the operation of the first and second pitch-direction actuators 51 and 52 and the electronic clutch 60. The controller 61 provides electric power to the electronic clutch 60 and the motors M installed in the first and second pitch-direction actuators 51 and 52, or shuts off the electric power being applied to the above components.

The knee joint 22L (see, FIG. 1) includes the pitch-direction knee joint 22LY (see, FIG. 1) which rotates the lower leg link 20L in the pitch direction relative to the femoral link 16L.

As shown in FIGS. 2 and 3, a power transmission unit 70 is provided to transfer driving force of the first pitch-direction actuator 51 to the knee joint 22L.

The power transmission unit 70 includes the femoral link 16L and a transfer link 73 spaced apart from the femoral link 16L by a predetermined distance. One end 71 of the femoral link 16L is fixed to the first pitch-direction femoral joint 41, and the other end 72 of the femoral link 16L is rotatably coupled to the knee joint 22LY. One end 74 of the transfer link 73 is rotatably coupled to the second pitch-direction femoral joint 42 and the other end 75 of the transfer link 73 is rotatably coupled to the lower leg link 20L. The one end 74 of the transfer link 73 is spaced apart from the center of the second pitch-direction femoral joint 42 by a predetermined distance.

The knee joint 22LY is provided at a predetermined region in the length of the lower leg link 20L. Thus, the lower leg link 20L can perform the see-saw movement about the knee joint 22LY. In other words, the lower leg link 20L can rotate in the pitch direction relative to the femoral link 16L. The femoral link 16L and the lower leg link 20L may form a parallelogram-type link structure in such a manner that the lower leg link 20L can perform the relative movement according to the relative movement of the femoral link 16L and the transfer link 73.

Hereinafter, the operation of the leg section 12L will be described while focusing on the operation of the power transmission unit 70 that drives the knee joint 22LY.

First, the operation of the first and second pitch-direction femoral joints 41 and 42 for folding the leg section 12L about the knee joint 22L will be described with reference to FIGS. 2 and 3. If the controller 61 shuts off the power being applied to the electronic clutch 60, the first and second pitch-direction femoral joints 41 and 42 are decoupled from each other. At the same time, the controller 61 supplies the power to the first pitch-direction actuator 51 without supplying the power to the second pitch-direction actuator 52, so that the first pitch-direction femoral joint 41 is driven and the second pitch-direction femoral joint 42 is not driven.

Figure 4:
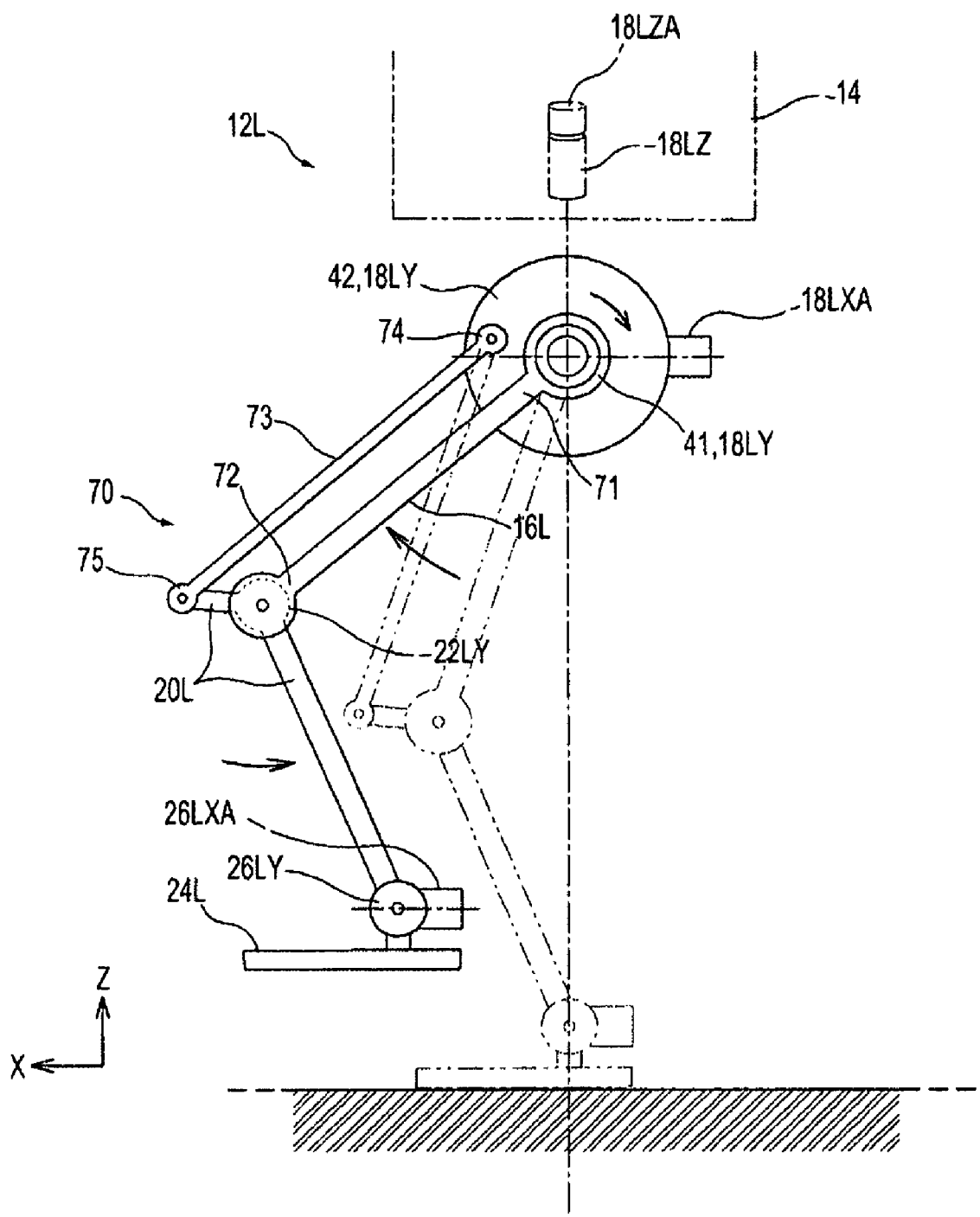
FIG. 4 is a view showing a femoral link and a lower leg link of the leg section, which rotate in opposite directions, according to the present invention.

FIG. 4 is a view showing the leg section 12L operated by the first pitch-direction actuator 51.

As shown in FIG. 4, if the first pitch-direction femoral joint 41 is driven, since one end 71 of the femoral link 16L is integrally coupled with the first pitch-direction femoral joint 41, the femoral link 16L is rotated in the pitch direction relative to the body 14. In addition, since the second pitch-direction femoral joint 42 is not driven, one end 74 of the transfer link 73 is not rotated about the second pitch-direction femoral joint 42. However, since the transfer link 73 is connected to the lower leg link 20L, the transfer link 73 is rotated about the one end 74 rotatably coupled to the second pitch-direction femoral joint 42.

Therefore, the other end 75 of the transfer link 73 presses the lower leg link 20L and the lower leg link 20L performs the see-saw movement about the knee joint 22LY. That is, the lower leg link 20L is rotated in the pitch direction relative to the femoral link 16L by driving the knee joint 22LY. At this time, the rotating direction of the lower leg link 20L is opposite to the rotating direction of the femoral link 16L which rotates relative to the body 14.

As a result, as shown in FIG. 4, the leg section 12L is folded about the knee joint 22LY, so that the foot 24L moves up from the ground.

Hereinafter, description will be made about the rotation of the femoral link 16L and the lower leg link 20L in the same direction in a state in which the leg section 12L is folded or unfolded about the knee joint 22LY.

First, the operation of the first and second pitch-direction femoral joints 41 and 42 required to rotate the femoral link 16L and the lower leg link 20L in the same direction will be described with reference to FIGS. 2 and 3. If the controller 61 supplies the power to the electronic clutch 60, the first and second pitch-direction femoral joints 41 and 42 are coupled to each other. At the same time, the controller 61 supplies the power to the second pitch-direction actuator 52 without supplying the power to the first pitch-direction actuator 51, so that the first pitch-direction femoral joint 41 is not driven and the second pitch-direction actuator 52 is driven.

Figure 5:
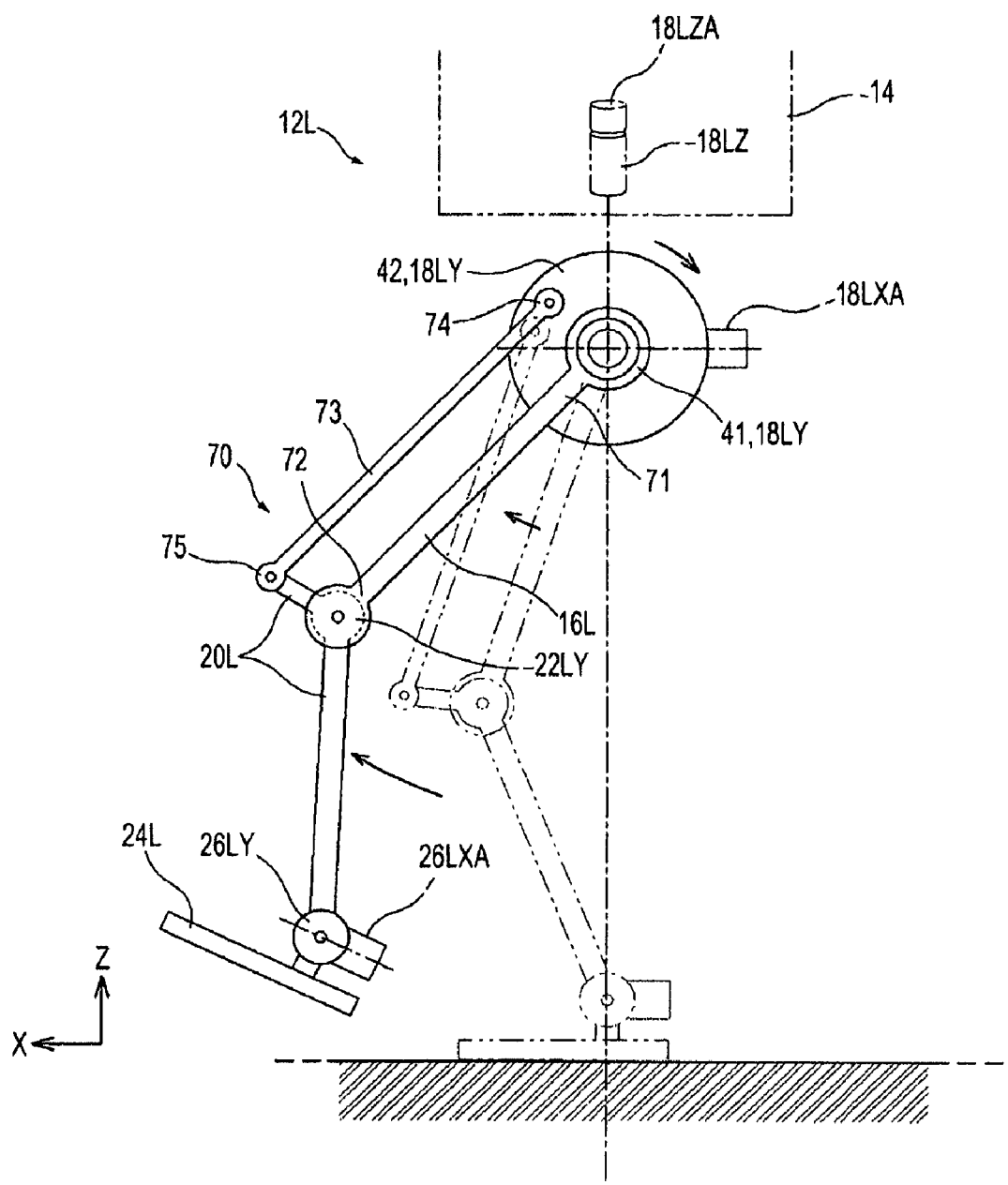
FIGS. 5 and 6 are views showing a femoral link and a lower leg link of the leg section, which rotate in the same direction, according to the present invention.

FIG. 5 is a view showing the leg section that is rotated in the forward direction by the second pitch-direction actuator according to the embodiment of the present invention.

FIG. 5 shows the leg section 12L that has been rotated in the forward direction in a state in which the leg section 12L is not folded about the knee joint 22LY. At this time, the femoral link 16L and the lower leg link 20L are rotated in the same direction, without causing the relative rotation therebetween. Referring to FIG. 5, if the second pitch-direction femoral joint 42 is driven, the femoral link 16L is rotated in the pitch direction relative to the body 14 about the second pitch-direction femoral joint 42. At this time, since one end 74 of the transfer link 73 is rotated together with the second pitch-direction femoral joint 42, the transfer link 73 may rotate while maintaining a predetermined interval relative to the femoral link 16L in parallel with the femoral link 16L. Thus, the other end 75 of the transfer link 73 does not press the lower leg link 20L, so that the lower leg link 20L does not rotate about the knee joint 22LY, but rotates in the pitch direction relative to the body 14 together with the femoral link 16L.

Figure 6:
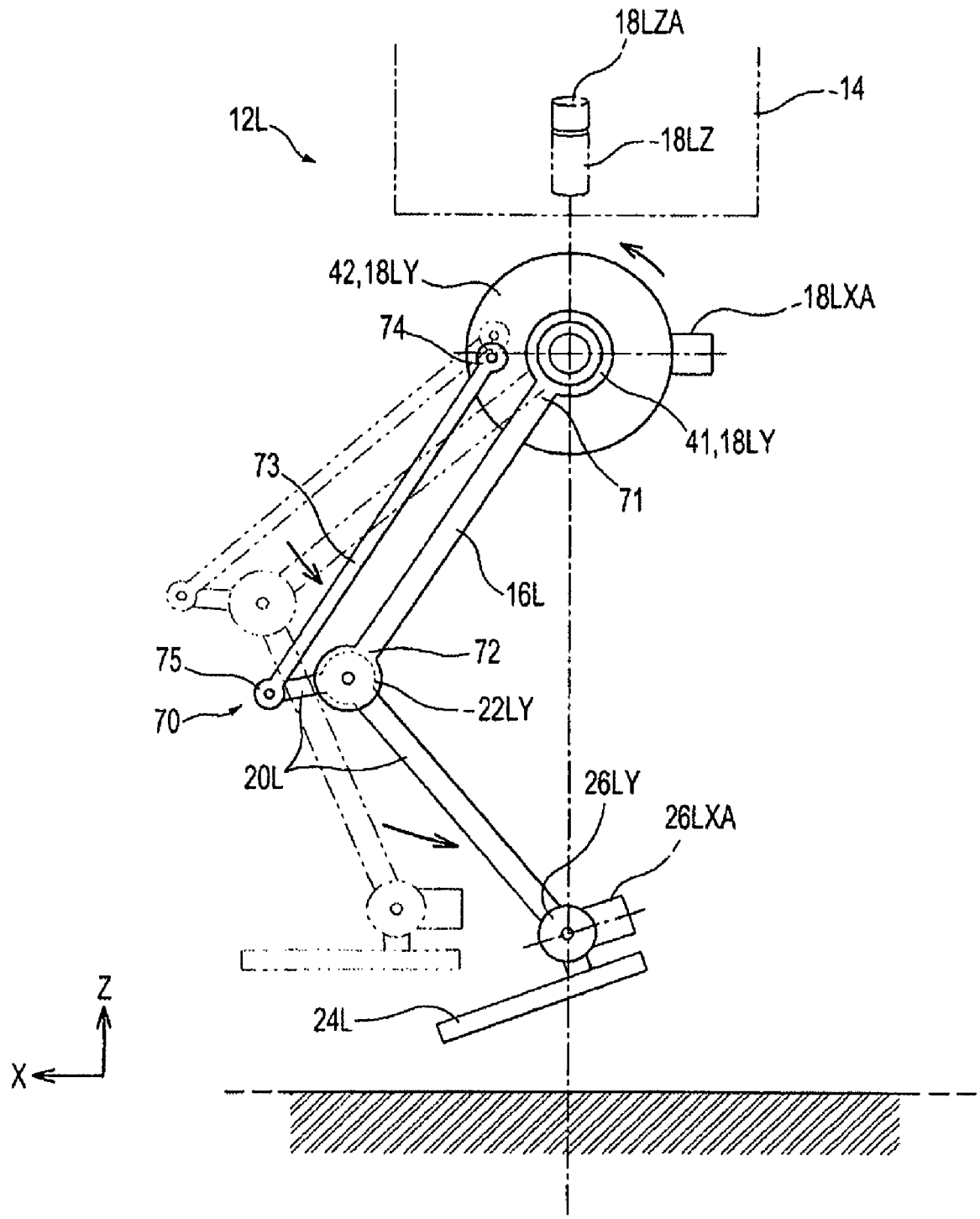

FIG. 6 is a view showing the leg section that has been rotated in the rearward direction by the second pitch-direction actuator.

FIG. 6 shows the leg section 12L that has been rotated in the rearward direction in a state in which the leg section 12L is folded about the knee joint 22LY. At this time, the femoral link 16L and the lower leg link 20L are rotated in the same direction, without causing the relative rotation therebetween.

The initial position of the leg section 12L shown in FIG. 6 is identical to the initial position of the leg section 12L shown in FIG. 5. That is, the leg section 12L is rotated in the rearward direction by the second pitch-direction actuator 52 in a state in which the leg section 12L has been folded about the knee joint 22LY.

The operational principle of the leg section 12L shown in FIG. 6 is identical to the operational principle of the leg section 12L shown in FIG. 5 except that the leg section 12L of FIG. 5 is rotated in the forward direction by the second pitch-direction actuator 52 and the leg section 12L of FIG. 6 is rotated in the rearward direction by the second pitch-direction actuator 52.

As shown in FIG. 4, if the femoral link 16L and the lower leg link 20L are rotated in opposite directions, the ankle joint 26L may greatly deviate from the yaw-direction femoral joint 18LZ. In this case, the center of gravity of the robot 10 may be shifted due to the leg section 12L, so that the robot 10 cannot keep the balance.

For this reason, the controller 61 operates the first pitch-direction actuator 51 such that the femoral link 16L and the lower leg link 20L are rotated in opposite directions as shown in FIG. 4. At the same time, the controller 61 operates the second pitch-direction actuator 52 such that the femoral link 16L and the lower leg link 20L are rotated in the same direction as shown in FIG. 6. As a result, the ankle joint 26L is positioned in line with the yaw-direction femoral joint 18LZ as shown in FIG. 6, so that the robot 10 can maintain balance.

FIGS. 2 to 6 show the driving structure for driving the lower leg link 20L relative to the femoral link 16L in the pitch direction by transferring the driving force of the first pitch-direction actuator 51 to the knee joint 22LY through the power transmission unit 70, and the driving structure driving the lower leg link 20L and the femoral link 16L relative to the body 14 in the pitch direction by using the driving force of the second pitch-direction actuator 52.

Referring again to FIGS. 2 and 3, a roll-direction actuator 26LXA is provided to rotate the foot 24L about the X axis by driving the roll-direction ankle joint 26LX, and a pitch-direction actuator 26LYA is provided to rotate the foot 24L about the Y axis by driving the pitch-direction ankle joint 26LY. The roll-direction actuator 26LXA and the pitch-direction actuator 26LYA may include a motor and a reduction device. In addition, other components, such as a linear actuator, can be used for the roll-direction actuator 26LXA and the pitch-direction actuator 26LYA. The driving structure for the ankle joint 26L is not the subject matter of the present invention, so the description thereof will be omitted.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A walking robot comprising:
   a body;
   a femoral link;
   a first pitch-direction femoral joint and a second pitch-direction femoral joint connecting the body to the femoral link;
   a lower leg link;
   a knee joint connecting the femoral link to the lower leg link;
   a first pitch-direction actuator driving the first pitch-direction femoral joint to rotate the femoral link relative to the body in a pitch direction;
   a second pitch-direction actuator driving the second pitch-direction femoral joint to rotate the femoral link relative to the body in a pitch direction; and
   a power transmission unit transferring a driving force of the first pitch-direction actuator and the second pitch-direction actuator to the knee joint to rotate the lower leg link relative to the femoral link in the pitch direction.

2. The walking robot as claimed in claim 1, further comprising a power control device installed between the first and second pitch-direction femoral joints to couple the first pitch-direction femoral joint with the second pitch-direction femoral joint or decouple the first pitch-direction femoral joint from the second pitch-direction femoral joint, and a controller controlling the power control device.

3. The walking robot as claimed in claim 2, wherein, when the first pitch-direction femoral joint is coupled with the second pitch-direction femoral joint, the controller supplies power to the second pitch-direction actuator without supplying power to the first pitch-direction actuator.

4. The walking robot as claimed in claim 2, wherein, when the first pitch-direction femoral joint is decoupled from the second pitch-direction femoral joint, the controller supplies power to the first pitch-direction actuator without supplying power to the second pitch-direction actuator.

5. The walking robot as claimed in claim 4, wherein the controller operates the second pitch-direction actuator.

6. The walking robot as claimed in claim 1, wherein the power transmission unit comprises the femoral link connected to the first pitch-direction femoral joint and a transfer link rotatably coupled to the second pitch-direction femoral joint and the lower leg link while being spaced apart from the femoral link, and the knee joint connecting the femoral link to the lower leg link is provided at a predetermined region on a length of the lower leg link.

7. The walking robot as claimed in claim 6, wherein the transfer link is spaced apart from a center of the second pitch-direction femoral joint by a predetermined distance.

8. The walking robot as claimed in claim 1, wherein, when the first pitch-direction femoral joint is driven, the power transmission unit rotates the lower leg link in a direction different from a rotating direction of the femoral link.

9. The walking robot as claimed in claim 1, wherein, when the second pitch-direction femoral joint is driven, the power transmission unit rotates the lower leg link in a direction identical to a rotating direction of the femoral link.

10. The walking robot as claimed in claim 1, wherein each of the first and second pitch-direction actuators comprises a motor generating rotational force and a reduction device adjusting a rotational speed of the motor.

11. The walking robot as claimed in claim 1, wherein the first pitch-direction femoral joint has a rotational center identical to a rotational center of the second pitch-direction femoral joint.

12. A walking robot comprising:
  a body;
  a femoral link;
  a first pitch-direction femoral joint and second pitch-direction femoral joint connecting a body to the femoral link;
  a lower leg link;
  a knee joint connecting the femoral link to the lower leg link;
  a first pitch-direction actuator and second pitch-direction actuator driving the first pitch-direction femoral joint and the second pitch-direction femoral joint to rotate the femoral link relative to the body in a pitch direction; and
  a power transmission unit driving the knee joint in cooperation with the first pitch-direction actuator and the second pitch-direction actuator to rotate the lower leg link relative to the femoral link in the pitch direction.

13. A walking robot comprising:
  a body;
  a leg section connected to the body and comprising a femoral link and a lower leg link;
  first and second pitch-direction femoral joints rotating the leg section relative to the body in a pitch direction;
  a first pitch-direction actuator driving the first pitch-direction femoral joint;
  a second pitch-direction actuator driving the first and second pitch-direction femoral joints; and
  a transfer link connecting the second pitch-direction femoral joint to the lower leg link to rotate the lower leg link relative to the femoral link in the pitch direction.

14. The walking robot as claimed in claim 13, further comprising a power control device transferring a rotational force of the second pitch-direction femoral joint, which is driven by the second pitch-direction actuator, to the first pitch-direction femoral joint or to shut off the rotational force being transferred to the first pitch-direction femoral joint.

* * * * *